Figure 5:
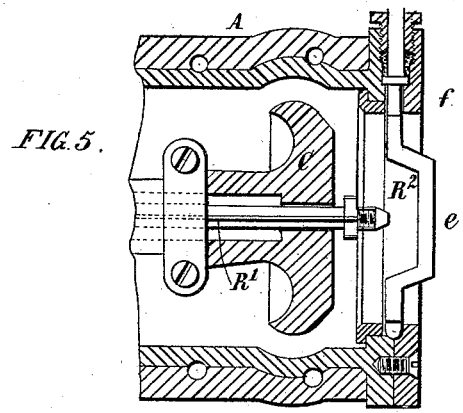

(No Model.) 3 Sheets—Sheet 1.
W. TULLY.
APPARATUS FOR CONTROLLING THE SUPPLY OF STEAM TO MOTORS.
No. 469,611. Patented Feb. 23, 1892.
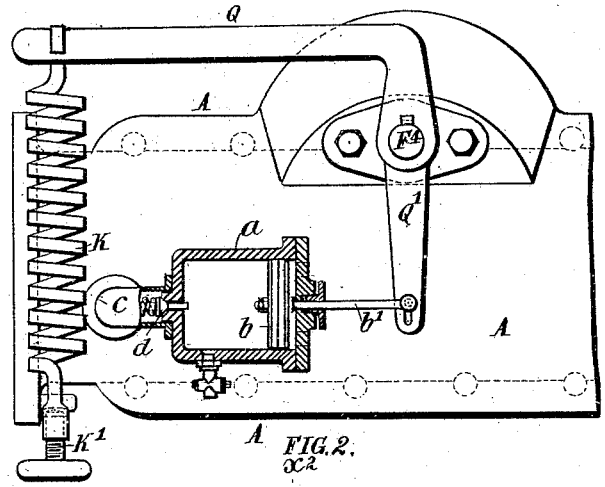
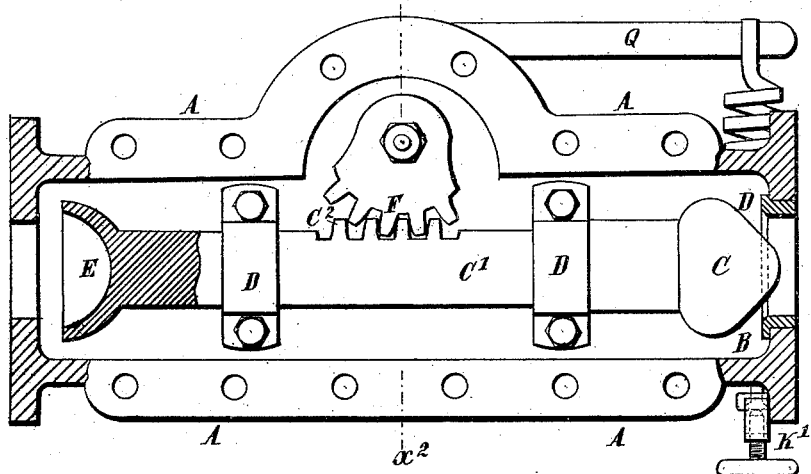
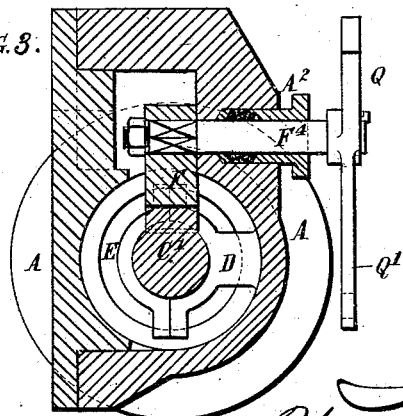

(No Model.) 3 Sheets—Sheet 2.
W. TULLY.
APPARATUS FOR CONTROLLING THE SUPPLY OF STEAM TO MOTORS.
No. 469,611. Patented Feb. 23, 1892.
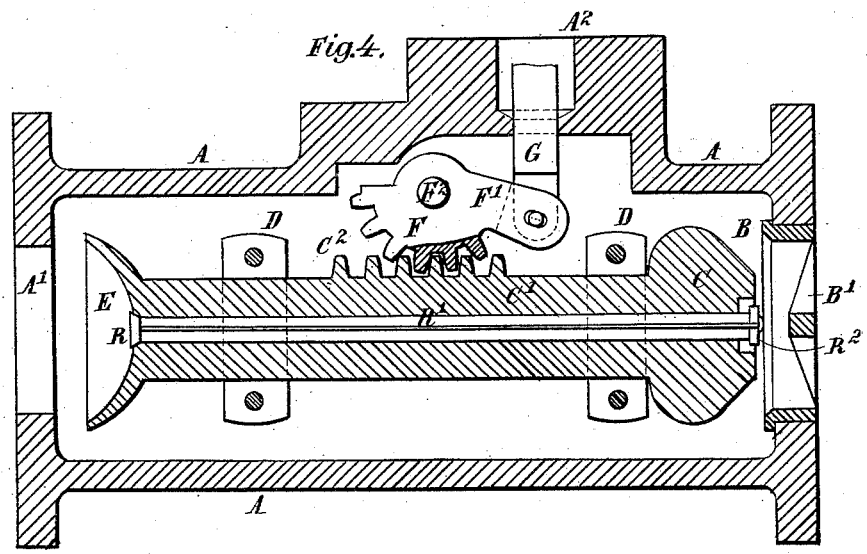

(No Model.) 3 Sheets—Sheet 3.

W. TULLY.
APPARATUS FOR CONTROLLING THE SUPPLY OF STEAM TO MOTORS.

No. 469,611. Patented Feb. 23, 1892.

Witnesses:
J. A. Rutherford
Geo. W. Rea

Inventor:
William Tully
By James L. Norris
Attorney

UNITED STATES PATENT OFFICE.

WILLIAM TULLY, OF LEYTONSTONE, ASSIGNOR OF ONE-HALF TO JOHN CORBETT, OF LONDON, ENGLAND.

APPARATUS FOR CONTROLLING THE SUPPLY OF STEAM TO MOTORS.

SPECIFICATION forming part of Letters Patent No. 469,611, dated February 23, 1892.

Application filed December 30, 1890. Serial No. 376,315. (No model.) Patented in England December 3, 1888, No. 17,610; in Germany July 10, 1889, No. 52,745; in Belgium November 30, 1889, No. 88,455, and in France January 23, 1890, No. 201,949.

*To all whom it may concern:*

Be it known that I, WILLIAM TULLY, engineer, a subject of the Queen of Great Britain, and a resident of Leytonstone, England, have invented certain new and useful Improvements in and Relating to Apparatus for Regulating or Controlling the Supply of Steam and other Fluids to Engines or Motors and for similar Purposes, (for which I have obtained patents in Great Britain, No. 17,610, dated December 3, 1888; in France, No. 201,949, dated January 23, 1890; in Belgium, No. 88,455, dated November 30, 1889, and in Germany, No. 52,745, dated July 10, 1889,) of which the following is a specification, reference being had to the accompanying drawings.

My invention relates to apparatus for regulating or controlling the flow of steam and other fluids.

The main object of my said invention is to provide for utilizing the dynamic force of the steam or other fluid for regulating or controlling the supply thereof to an engine or motor—that is to say, for regulating or controlling the flow of the steam or other fluid by the variations in the velocity of the same, due to diminution or increase of the work which has to be performed by the engine or motor.

My said invention affords efficient means for preventing "racing" of marine and other engines.

An important feature of my said invention is a combined governor or regulator and stop-valve, whereby the supply of steam or other fluid can be regulated or controlled by hand, as required, and should the speed of the engine increase by reason of any sudden diminution of the work which it has to perform the supply of steam or other fluid thereto will be automatically cut off or diminished by the closing of the valve by the dynamic force of the fluid. This apparatus is so constructed that the valve whereby the regulation or control of the flow of the fluid is automatically effected is also utilized for effecting such regulation or control by hand. A spring or its equivalent is employed for effecting the return movement of the valve and is provided with means for adjusting it to suit any desired working pressure.

My said invention also comprises other improvements hereinafter set forth.

In the accompanying drawings I have shown how my said invention may be conveniently and advantageously carried into practice.

Figure 1 is a side elevation, Fig. 2 a vertical longitudinal central section, and Fig. 3 a transverse section on the line $x^2$ $x^2$, Fig. 2, showing a modification of my apparatus. Fig. 4 is a vertical longitudinal central section illustrating a further modification of the said apparatus. Fig. 5 is a vertical longitudinal central section, and Fig. 6 an end elevation illustrating a still further modification of the apparatus shown in Fig. 4. Fig. 7 is a side elevation, partly in vertical section, showing another modification of my invention.

Like letters indicate corresponding parts throughout the drawings.

A is a casing or chamber, which is designed to form part of the supply-pipe for the steam or other fluid. In one end of this casing is fixed a valve-seat B. C is the valve, which is so arranged in the said casing that it can slide longitudinally to and from the said seat B. The stem or spindle C' of the valve C extends through bearings or guides D, formed or fixed in the casing A and provided with removable caps to permit the withdrawal and replacement of the valve when necessary. The said valve C is formed or fixed on one end of the stem or spindle C', and the other end of this stem or spindle is provided with a hollow cone or cup E, or it may be provided with a disk or head; or the cup may be reversed, if desired. The casing A is provided with a contracted part A' of less diameter than the said disk, head, or cup, so that when the speed of the engine suddenly increases the steam or other fluid passing through the said contracted part of the pipe with great velocity and impinging against the said disk, head, or cup will drive or force the said valve toward its seat. The valve-stem C' is provided with rack-teeth $C^2$, with which is geared a toothed segment F.

To effect or assist in effecting the reopening of the valve C should it be closed by the force of the steam or other fluid, I employ a strong spring K', so arranged that it will come into action when, but not until, the said valve is nearly closed and will then resist the further closing and assist in the reopening of the said valve.

In the modification of my invention illustrated in Figs. 1, 2, and 3 the toothed segment F is fixed upon a spindle $F^4$, which extends through a stuffing-box $A^2$ in the casing A, and which has fixed on its outer end a lever Q. This lever is acted upon at its free end by a spring K, provided with a screw for regulating its tension. I sometimes provide a suitable clip, so that the lever Q may be operated by hand to close the valve C and may then be held in position by the said clip. The apparatus thus arranged is a combined governor and stop-valve.

To insure the reopening of the valve C should the same be closed by a sudden rapid flow or rush of steam or other fluid through the valve casing A, I sometimes provide my apparatus with a small steam-cylinder $a$, Fig. 1, having a piston $b$, the rod $b'$ of which is coupled to the short arm Q' of the lever Q. The cylinder $a$ is connected with the interior of the casing A by means of a pipe or passage $c$, provided with a valve $d$ for closing it. These parts are so arranged that in the closing of the valve C the lever Q will be turned about its fulcrum $F^4$ through such an angle that its arm Q' will move the piston $b$ in the corresponding direction through a sufficient distance to open the valve $d$. Steam will thus be admitted to the cylinder $a$, and, by its action upon the piston $b$, will assist in effecting the opening of the valve C. As the piston $b$ moves in the reverse direction the valve $d$ will close automatically.

In the modification of my invention illustrated in Fig. 4 I provide for permitting the passage of steam or other fluid through the valve when the latter is closed, in order to facilitate the reopening of the valve by the spring. For this purpose I bore a hole longitudinally through the valve C and provide the same with a relief-valve R, the spindle R' of which extends through the valve C and is retained therein by a nut or head $R^2$. The spindle R' and nut or head $R^2$ are so shaped as to permit the passage of steam through the valve C when the valve B is open. The valve-seat B is provided with a bridge B', against which, when the valve C is closed, the spindle R' will strike. The said spindle will thereby be moved longitudinally and the valve R thus opened. When the valve C is reopened, the valve R will be closed by the fluid acting upon it.

I sometimes provide the valve-stem C' with more than one cup or disk for the fluid to act upon for the purposes of closing the valve C. Moreover, in some instances I form a cup at the back of the valve C.

Figure 6:
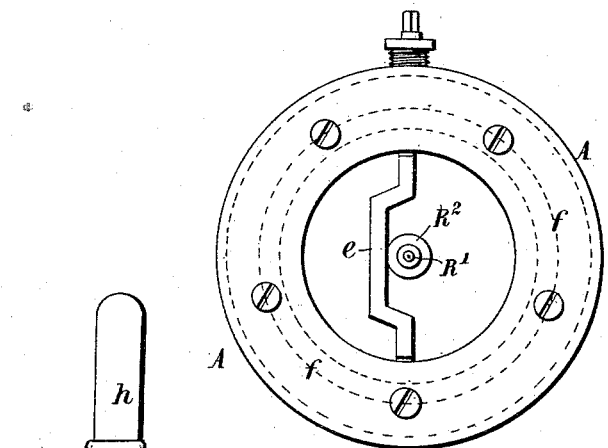
Figure 7:
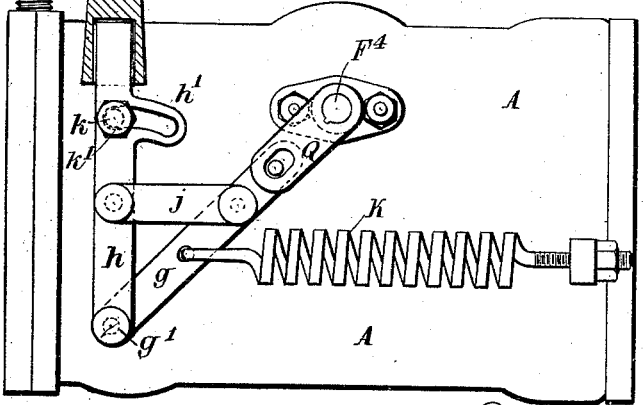

When the apparatus is intended to serve as a governor and also as a stop-valve, I find it advantageous to substitute for the bridge B' (shown in Fig. 4) a cranked rod $e$, Figs. 5 and 6, which can be turned about its axis into either of two positions—that is to say, into such a position that when the valve C is closed the spindle R' will strike the said bar and the valve R will be opened to equalize the pressure, as above specified, or into such a position that the said rod will be out of reach of the spindle R' and the valve C can be tightly closed by hand without opening the valve R. For securing the rod $e$ in place I provide an annular piece or disk $f$, which is secured to the flange at one end of the casing A. Between the said disk and flange is arranged the said cranked rod $e$, one end of which extends through a suitable stuffing-box, so that a spanner or key can be applied for turning the said rod about its axis.

To diminish the extension of the spring K, I sometimes modify the construction of my apparatus, as shown in Fig. 7—that is to say, I connect the said spring K at one end to the casing A and at its other end to a lever $g$, pivoted at $g'$ to the said casing. This lever is coupled at its free end to a lever Q, fixed on the spindle $F^4$. It is evident that the extension of the spring K will in this case be much less than in the modification of my invention shown in Fig. 1.

For closing the valve C by hand I sometimes provide a hand-lever $h$, which is also pivoted at $g'$, and which is connected with the lever $g$ by a link $j$. The said lever $h$ is formed with a curved slot $h'$, through which extends a stud $k$, which is provided with a nut $k'$ for securing the said lever in any desired position.

It will be seen that in the different forms or modifications of my combined governor and stop-valve above described the valve C serves for the regulation or control of the flow of the fluid by the dynamic force of the same and also for effecting such regulation or control by hand.

I do not confine myself to the use of a spring for keeping the valve C away from its seat and effecting the return movement of the said valve after it has been moved toward its seat. I can, if desired, use for this purpose one or more weights placed, for example, on the rod G or on the lever Q. Moreover, I can use means other than those above described for connecting the valve with the spring or for operating the said valve by hand.

Although I have more particularly described my improvements as applied to the regulation of the supply of high-pressure fluid to an engine or motor, it is obvious that they are also applicable in other cases where it is desired to regulate or control the flow of steam or other fluid. For instance, my improved apparatus may be used as a gas-governor or for regulating the flow of water or other liquids. Moreover, the valve may be used in a vertical instead of a horizontal position.

What I claim is—

1. A regulating or controlling valve wherein the valve proper is provided with hollow cones or cups to be acted upon by the dynamic force of the fluid, and also with a spring or its equivalent which keeps or tends to keep the said valve away from its seat, in combination with a supplementary valve that is automatically opened when the main valve is closed or nearly closed, substantially as set forth.

2. In a regulating or controlling valve, the combination of the valve proper, a spring or its equivalent connected to the said valve by means of a rack-and-segment pinion, and a supplementary valve that is automatically opened when the main valve is closed or nearly closed, substantially as described.

3. The combination, with the spring-controlled regulating-valve, of a cylinder $a$, having a valve $d$, acted upon to close the same by the fluid-pressure in the thoroughfare leading to the main valve, the piston $b$ of the said cylinder being coupled to the main valve so as to move therewith and so constructed as to engage with and open the valve $d$ when the main valve is closed or nearly closed, substantially as and for the purpose specified.

4. The combination, with the valve, of the operating-lever Q, the lever $g$, pivoted to the casing and coupled to the said lever Q, and the spring K, acting upon the said lever $g$, substantially as and for the purposes set forth.

5. The combination, with the valve, of the operating-lever Q, the lever $g$, pivoted to the casing and coupled to the said lever Q, the spring K, acting upon the said lever $g$, the lever $h$, pivoted to the casing and coupled to the lever $g$ by a link $j$, and a bolt $k$, working in a slot $h'$ and adapted to fix the lever $h$ in various positions, substantially as and for the purpose specified.

In testimony whereof I have hereunto signed my name in the presence of two subscribing witnesses.

WILLIAM TULLY.

Witnesses:
  JOHN THOMAS KNOWLES,
  GEORGE HOAR,
*Both of 45 Southampton Buildings, London, England.*